United States Patent
Mackay et al.

(10) Patent No.: US 9,941,029 B2
(45) Date of Patent: Apr. 10, 2018

(54) BUOYANT MARINE ELECTROMAGNETIC CABLE ASSEMBLY

(71) Applicant: PGS Geophysical AS, Oslo (NO)

(72) Inventors: James Mackay, Oslo (NO); Philip Heelan, Oslo (NO); Peter Lindqvist, Kista (SE)

(73) Assignee: PGS Geophysical AS, Oslo (NO)

( * ) Notice: Subject to any disclaimer, the term of this patent is extended or adjusted under 35 U.S.C. 154(b) by 378 days.

(21) Appl. No.: 14/186,912

(22) Filed: Feb. 21, 2014

(65) Prior Publication Data

US 2015/0061685 A1 Mar. 5, 2015

Related U.S. Application Data

(60) Provisional application No. 61/873,079, filed on Sep. 3, 2013.

(51) Int. Cl.
*G01V 3/17* (2006.01)
*H01B 7/17* (2006.01)
(Continued)

(52) U.S. Cl.
CPC ............... *H01B 7/17* (2013.01); *G01V 1/20* (2013.01); *G01V 3/17* (2013.01); *G01V 3/083* (2013.01);
(Continued)

(58) Field of Classification Search
CPC .................................. G01V 1/201; G01V 3/17
See application file for complete search history.

(56) References Cited

U.S. PATENT DOCUMENTS 6,239,363 B1  5/2001  Wooters
6,426,464 B1* 7/2002  Spellman ............... H01Q 1/04
                                              174/101.5
(Continued)

FOREIGN PATENT DOCUMENTS

EP  1690979 A2  8/2006
GB  2178506 A   2/1987
(Continued)

OTHER PUBLICATIONS

James Brady et al., "Electromagnetic Sounding for Hydrocarbons", Olifield Review, Spring 2009, 21, No. 1, pp. 4-19.
(Continued)

*Primary Examiner* — Jermele M Hollington
*Assistant Examiner* — Feba Pothen
(74) *Attorney, Agent, or Firm* — Patterson & Sheridan, LLP (57) ABSTRACT

Embodiments described herein provide an EM source cable assembly with a buoyant member having first and second ends, and a longitudinal axis connecting the first end to the second end, and a plurality of indentations disposed along a surface of the buoyant member between the first end and the second end, wherein the indentations are operable to receive corresponding cables. The indentations extend along the longitudinal axis, and may be arranged helically about the longitudinal axis. The buoyant member may have a low density core material and a dense outer material, each of which may be a polymeric material. The low density material may be a foam, and the buoyant member may be formed by coextruding the low density material and the dense outer material.

27 Claims, 7 Drawing Sheets (51) Int. Cl.
*G01V 1/20* (2006.01)
*G01V 3/08* (2006.01)
*H02G 9/12* (2006.01)

(52) U.S. Cl.
CPC ......... *G01V 2001/207* (2013.01); *H02G 9/12* (2013.01)

(56) References Cited

U.S. PATENT DOCUMENTS

| | | |
|---|---|---|
| 6,533,627 B1 | 3/2003 | Ambs |
| 7,737,698 B2 | 6/2010 | Tenghamn et al. |
| 8,207,448 B2 | 6/2012 | Hui |
| 8,514,656 B2 | 8/2013 | Juhasz et al. |
| 2006/0125699 A1* | 6/2006 | Kasamatsu ........... G06F 1/1605 343/702 |
| 2008/0296040 A1* | 12/2008 | Hui ..................... H01B 7/12 174/101.5 |
| 2011/0292759 A1 | 12/2011 | Sudow et al. |
| 2012/0153959 A1* | 6/2012 | Mackay ................ G01V 3/12 324/365 |
| 2012/0287751 A1 | 11/2012 | Elvestad |
| 2013/0062092 A1* | 3/2013 | Hui ......................... H01B 7/12 174/101.5 |
| 2013/0087382 A1* | 4/2013 | Erlich ..................... H02G 9/12 174/74 A |
| 2013/0093426 A1 | 4/2013 | Peppe et al. |

FOREIGN PATENT DOCUMENTS

| | | |
|---|---|---|
| GB | 2488658 A | 9/2012 |
| WO | 2010081504 A1 | 7/2010 |

OTHER PUBLICATIONS

Staff Report, "2014 Meritorious Awards for Engineering Innovation", www.epmag.com/item/print/2014-Meritorious-Awards-Engineering-Innovation-132699, Aug. 28, 2014, see p. 8, 12 pages total.
European Search Report for Application No. 14183044.8 dated Oct. 9, 2015.
European Search Report for Application No. 14183044.8 dated Sep. 10, 2015.

* cited by examiner

BUOYANT MARINE ELECTROMAGNETIC CABLE ASSEMBLY

CROSS-REFERENCE TO RELATED APPLICATIONS

This application claims benefit of U.S. Provisional Patent Application Ser. No. 61/873,079, filed Sep. 3, 2013, entitled "Buoyant Marine EM Source Cable Carrier", which is herein incorporated by reference.

BACKGROUND

Embodiments of the present invention generally relate to marine geophysical processing and may have particular applicability to electromagnetic surveying. More specifically, cable configurations are disclosed that may be used for geophysical prospecting.

In geophysical prospecting in a marine environment, cable configurations are often towed behind a vessel to generate electromagnetic ("EM") signals that may be helpful in identifying geophysical features. Wires or cables for generating such signals may be bundled into source cables (also called "sources") that are commonly jacketed or wrapped in an enclosure. The jacketing serves a number of purposes in the conventional EM source, including preventing exposure of some components to water and providing buoyancy. A cable assembly having proper buoyancy will maintain a desired depth as it is towed through the water.

Figure 1:
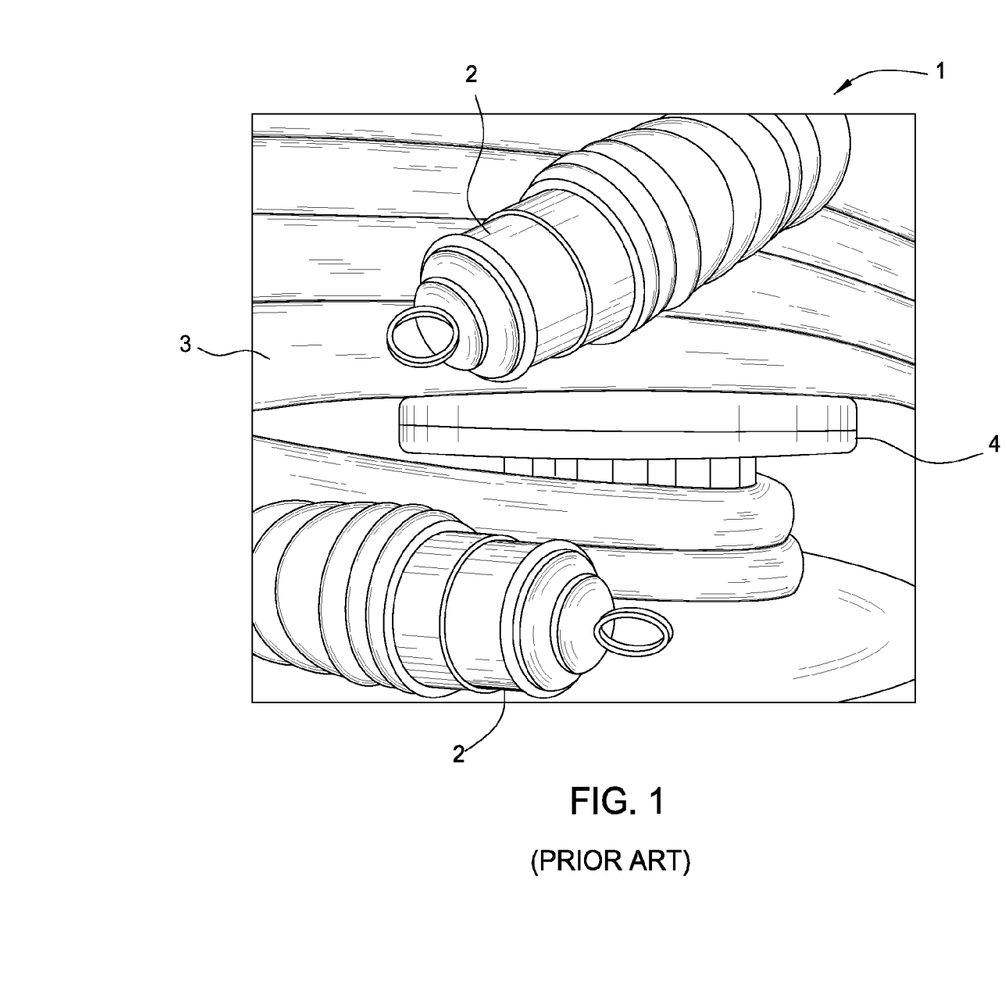
FIG. 1 is a schematic drawing of a prior art cable assembly.

FIG. 1 is a drawing of a prior art EM source cable assembly 1. The prior art cable assembly 1 is shown partially lying on, and partially wrapped around, a spool 4. The cable assembly 1 has a connector 2 at each end thereof for connecting to a vessel or to another cable. The body 3 of the cable assembly 1, lying on, and wrapped around, the spool 4 in loops, has a surface characteristic of the jacketing material commonly used for such cable assemblies.

As mentioned above, conventional EM source cable assemblies typically include wires, and sometimes devices, wrapped in a jacketing material. Buoyancy members may be bundled with the wires and devices, and the full assembly may be jacketed. Such cable assemblies can build up heat from power flowing through the wires, in some cases requiring additional features or specialized devices or materials to remove or manage heat. This may be especially problematic for operations using high-power sources. Additionally, replacing wires and devices often requires disassembling the cable assembly, replacing malfunctioning wires and devices, and reassembling the cable assembly. Thus, there is a need for new cable assemblies that can be used for geophysical prospecting.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

This disclosure relates generally to the field of marine geophysical prospecting, and it may have particular applicability in electromagnetic (EM) surveying. In EM surveying, an EM source may be used to generate signals that interact with various geological features and are then detected, for example via sensors on an EM sensor streamer. The source is typically a cable assembly in which a plurality of wires or cables, and optionally devices, are bundled together.

This disclosure describes a flexible "cable assembly" that provides buoyancy operable to support conducting wires, or other types of wires or optical fibers, when being towed underwater at, for example, a typical depth of about 10 m to 100 m. The flexible cable assemblies described herein may offer the ability for standard, off the shelf, inexpensive and readily available conducting wires, devices, and accessories, which may be modified for use in certain environments such as offshore or deep water, to be mounted to the flexible cable assembly.

The cable assembly described herein may be used for EM sources. A typical EM source may have strength members, such as thick ropes that act as load-bearing members and run a substantial portion of the length of the source. An EM source may also have power and/or signal wires that run a substantial portion of the length of the source, either in segments attached end-to-end or in a continuous cable. An EM source may also have EM emitters disposed along the source. The EM emitters may be electrodes, wire loops, or other devices that are configured to emit electromagnetic fields. In one common configuration, an EM source has two EM emitters separated by a distance of about 800 m. The EM emitters may be connected to the power wire and/or to a separate signal wire. An EM emitter may be coupled to a power or signal cable in a collinear fashion, for example spliced into the cable, or the EM emitter may be disposed alongside a cable and connected to the cable. The wires and cables that make up a typical EM source can be heavy, especially in operations using high-power sources. Typically EM source cable assemblies will have added buoyancy to counteract the weight of the wires and cables.

Figure 2:
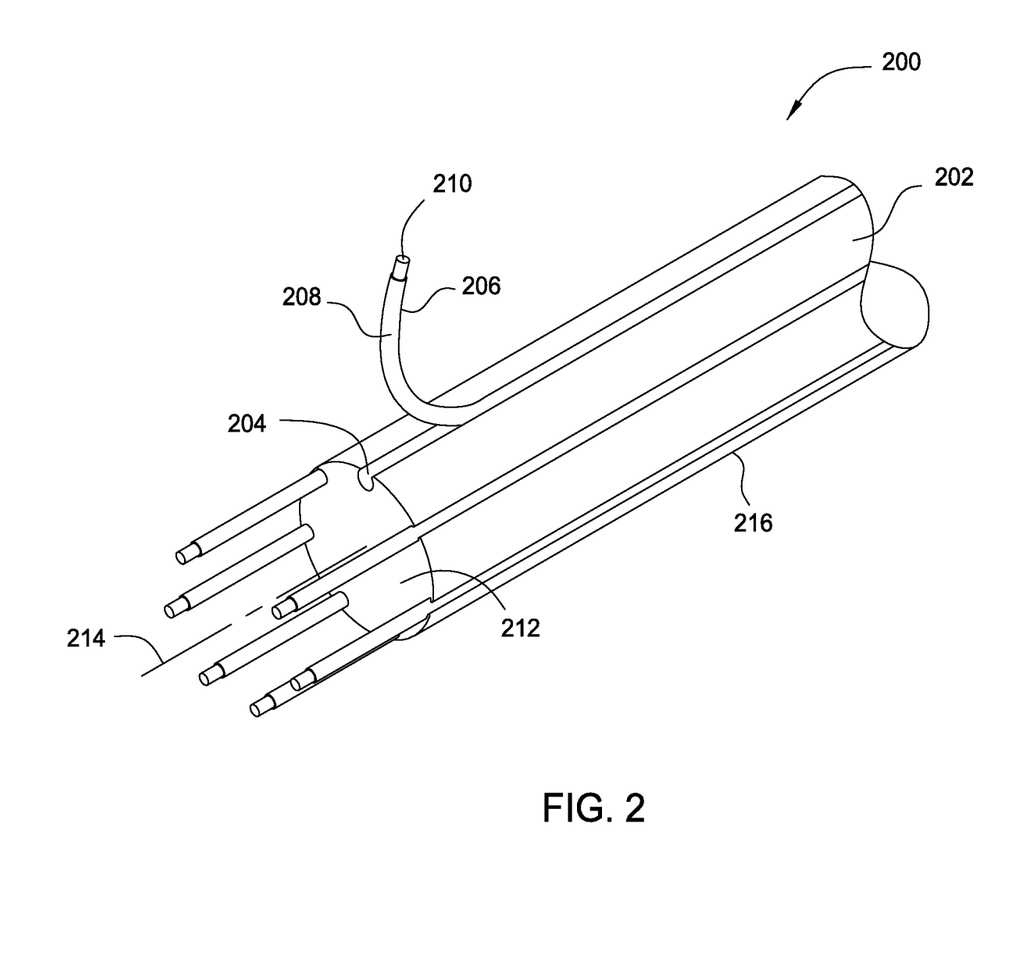
FIG. 2 is a perspective view of a cable assembly according to one embodiment.
Figure 3:
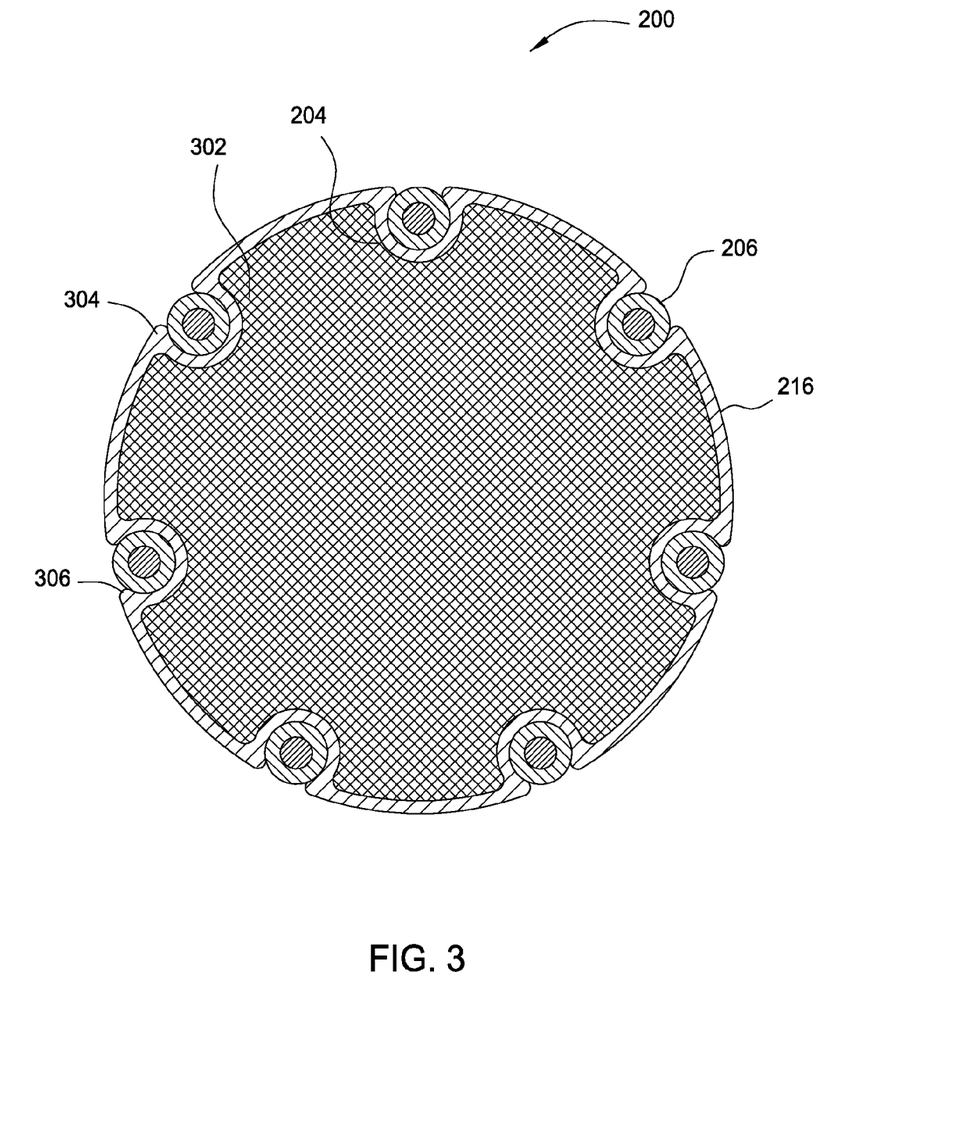
FIG. 3 is a cross-sectional view of the cable assembly of FIG. 2.

FIG. 2 is a perspective view of a cable assembly 200 according to one embodiment. FIG. 3 is a cross-sectional view of the cable assembly 200 of FIG. 2. The cable assembly 200 has a buoyant member 202 that has a first end 212 and a second end (not shown in FIG. 2) and a longitudinal axis 214 connecting the first end 212 to the second end. The buoyant member 202 may have a surface 216 with a plurality of recesses 204 disposed along the surface 216 between the first end 212 and the second end. The recesses 204, which may be evenly spaced around the buoyant member 202, and which may be substantially parallel, and may extend along the longitudinal axis 214, are operable to receive corresponding cables 208.

The cables 208 may be any cables typically deployed in an EM source cable assembly for geophysical prospecting. The cables 208 may be strength members, power cables, data wires, signal wires, optical fibers, buoyancy members, ballast members, or any combination thereof. The cables 208 may be pressed into the recesses 204, as shown in FIG. 2, or the cables 208 may be drawn through the recesses 204 from the first end 212 to the second end of the cable assembly 200. The cables 208 may have a covering 206 over a cable core 210. The covering 206 may be a jacket or an insulation material, and the cable core 210 may be a conductive material. As would be understood by one of ordinary skill in the art with the benefit of this disclosure, cables 208 and recesses 204 may be designed to create a snug fit, thereby holding cables 208 in place in recesses 204. Some embodiments may be designed to allow for cables 208 to be repeatedly pressed into and removed out of recesses 204. Other embodiments may be designed to allow only for cables 208 to be drawn through recesses 204, but not pressed into or removed out of recesses 204. Some embodiments may be designed for to allow cables 208 to be pressed into recesses 204 only a single time. Some embodiments may be designed to allow cables 208 to be removed out of recesses 204 only a single time.

The buoyant member 202 has a core 302 that may be made from a low density material, for example a material having a density less than a density of water such as ocean water. Although as illustrated, core 302 makes up more than 90% of buoyant member 202, the fraction of buoyant member 202 made up by core 302 may vary based on operational preference. For example, in some embodiments, core 302 may make up 50%-90% of buoyant member 202. In some embodiments, core 302 may make up as little as 25% of buoyant member 202. The core 302 may fill the most central volume of buoyant member 202, or the core 302 may be disposed in rings or other axially symmetrical volumes in buoyant member 202. The low density material or core 302 may be a polymer material such as a polyolefin, a rubber, or a thermoplastic material. The low density material may be flexible to a desired extent to provide ease of handling and operating (for example to allow reeling onto a spool for storage). The low density material may be a polymer foam. Some materials that may be used to make the low density material for the core 302 include polyethylene, polypropylene, polyurethane, polyisocyanurate, polystyrene, polybutadiene, polyisoprene, or any mixture thereof. Recycled plastic may be used for some embodiments. In some embodiments, the low density material may be selected to provide adequate operational buoyancy for cable assembly 200. Cables 208 may be heavy, especially when high power operations indicate usage of increased wire thickness. The low density material may be selected so that buoyant member 202 can provide supplemental buoyancy to balance the weight of cables 208.

The cable assembly 200 may have an outer shell 304, which may be made from a material that is denser than that for core 302. For example, the outer shell 304 may be a coating layer or a higher density outer skin. The outer shell 304 may be a wear-resistant material such as a high density polymer, which may also be resistant to accumulation of barnacles or other unwanted materials. Materials that may be used to make the outer shell 304 may include, for example, polyethylene, polypropylene, polyurethane, polyisocyanurate, polystyrene, polybutadiene, polyisoprene, or any mixture thereof. The outer shell 304 may be made of the same material as the core 302, just with a higher density, or the outer shell 304 may be a different material from the core 302.

Figure 4:
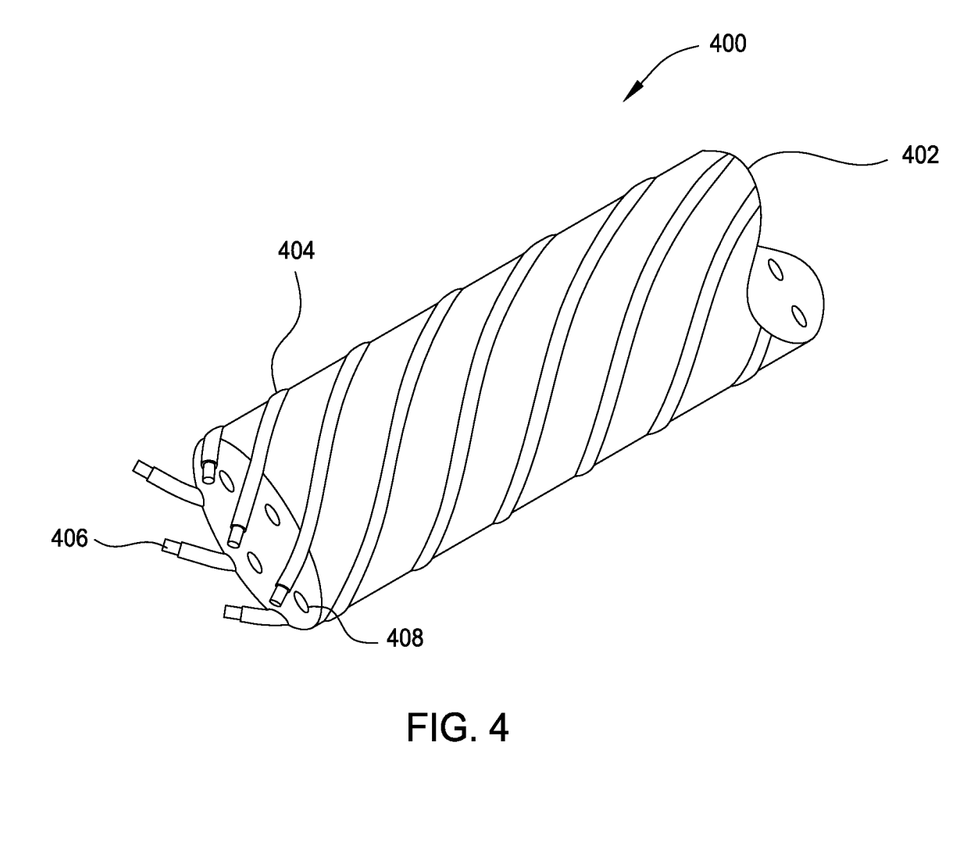
FIG. 4 is a perspective view of a cable assembly according to another embodiment.

In some embodiments, the core 302 and the outer shell 304 may be made by co-extruding the two components or by a coating process in which the core 302 is dipped, sprayed, painted, heat-wrapped or otherwise coated with the outer shell material. The recesses 204 may be made in the extrusion process using a shaped die, or the core 302 may be formed as a cylindrical body and the recesses 204 formed thereafter by removing material. It should be noted that the cable assembly 200 is depicted in FIGS. 2-4 as a cylindrical or cylinder-shaped member, having a substantially circular cross-section, but other shapes may be used. Disregarding the recesses 204, the cable assembly 200 may be formed with a substantially elliptical, oval, square, rectangular, polygonal, rounded polygonal, or irregular cross-section. In some embodiments, the cable assembly 200 may be formed with a shape selected to provide a certain hydrodynamic effect, such as lift, low drag, rotation, and the like, when towed through water.

The cable assembly 200 may have any convenient transverse dimension or diameter to accommodate the desired cables. In one embodiment, the cable assembly 200 is a cylinder-like assembly with a diameter of about 12 inches. The outer shell 304 may have a thickness that is up to about 0.5 inches, such as between about 0.01 inches and about 0.3 inches, for example about 0.1 inches. A ratio of thickness of the outer shell 304 to diameter or dimension of the buoyant member may be up to about 0.1, such as between about 0.001 and about 0.08, for example about 0.02. In another embodiment, the cable assembly 200 is a cylinder-like assembly with a diameter of about 190 mm and 7 cables 208 having a diameter of about 5.5 mm disposed in the recesses 204. Dimensions may be adjusted to accommodate specific needs, such as vessel handling.

The cable assembly 200 buoyant member may have a composite profile, which may consist of a wear-resistant, higher density outer shell 304, with a low density core 302. The higher density shell 304 may be conformal, evenly covering the contours of the core 302 to form surface 216 of the buoyant member 202. Both materials in such a composite profile may be extruded simultaneously by a coextrusion process, although one single material extrusion may also be used in some embodiments. The coextrusion may be simultaneous, concurrent, or sequential. The composite profile may also consist of a varying composition, such as a graded composition, either of the core 302 or the shell 304, or a varying density, such as a graded density. For example, in some embodiments, the core 302 may have a series of layers having a density that increases from a center of the core 302 to a periphery of the core 302. The outer layer of such a series of layers may be the outer shell 304, such that the cable assembly 200 has a substantially continuous density gradient from center to surface.

The recesses 204 may be formed with a partial closure 306 that extends toward a central axis of the recess 204 to partially cover a cable 208 disposed in the recess 204. The partial closure 306 may secure the cable 208 in the recess 204 to prevent disengagement during operation or handling. The partial closure 306 may have a corner with any desired shape to provide a desired surface smoothness for the cable assembly 200.

The cable assembly 200 may have any number of recesses 204 formed around the longitudinal axis 214 of the buoyant member 202. Spacing between the recesses 204 around the periphery of the surface 216 may be substantially even, or uneven according to any desired pattern. If the cable assembly 200 may have an irregular or axially non-symmetric shape, the recesses 204 may be spaced around the periphery to provide a balanced weighting or torque, or an unbalanced weighting or torque, on the cable assembly 200 during operation.

The recesses 204 may be substantially circular in profile, following the common shape of wires, or the recesses 204 may have a more groove-like or trench-like profile in some embodiments. In such an embodiment, the cable 208 may be press fit into the recess 204 such that friction between the cable surface and the recess surface provides additional retention force for the cable 208 in the recess 204. The dimensions of the recesses 204 may depend on the size of the cable assembly 200, the number of recesses 204 in the surface 216 of the cable assembly 200, and the size of the cable 208 (and optionally devices) to be accommodated. A ratio of recess diameter or dimension to diameter or dimension of the buoyant member may be up to about 0.3, such as between about 0.05 and about 0.2, for example about 0.12.

In the embodiment of FIG. 3, two different types of material are shown according to the coextrusion process discussed above. However, as also noted above, a single type of material may be used in some embodiments.

As illustrated in FIG. 3, the buoyant member 202, when used to carry cables for an EM source, provides, in addition to buoyancy, contact with water that may be utilized for cooling of the cables 208. Power cables in an EM source typically produce heat, which may increase with power load. As would be understood by one of ordinary skill in the art with the benefit of this disclosure, flooding the recesses 204 with water may provide cooling for the cables 208. The recesses 204 provide a cable housing that disposes the cables 208 on or near the surface of the buoyant member 202, thereby providing intimate contact with water when in operation, and allowing for cooling of the cables 208. Recessing the cables 208 into the surface 216 of the buoyant member 202 provides a relatively streamlined profile for the cable assembly 200, and allows the cable assembly 200 to be reeled and unreeled, using a spool and a turning device, such as a winch, for easy deployment of the cable assembly 200.

FIG. 4 is a perspective view of a cable assembly 400 according to another embodiment. The cable assembly 400 features core 402 with a helical pattern of cables 406 disposed in helical recesses 404. Such a pattern of recesses 404 may be formed, for example, in a coextrusion process, as described herein, using a rotating die, or the core 402 may be formed as a cylindrical body and the recesses 404 formed thereafter by removing material or forming indentations. Indentations may be formed, for example, by softening the surface of the core 402 and pressing a shaping member into the softened surface. Any number of helical recesses 404, one helical recess 404 or more than one helical recess 404, may be formed in the cable assembly 400. The pitch of the helical recesses 404, defined as distance between two adjacent recesses 404 along the length of the cable assembly 400, depends on the number of recesses, the diameter of the cable assembly 400, the weight of the cables, and the buoyancy of the buoyant member. If the pitch is too small, the cable assembly 400 might not have the desired buoyancy due to density of cables and other dense features, or the recesses might not reliably retain the cables during handling and operation. A ratio of pitch to diameter may be at least about 0.3.

The recesses in any of the embodiments described herein may be parallel or non-parallel. Non-parallel recesses may intersect or may remain apart. In some embodiments, two or more recesses may intersect or merge to accommodate cables that may intersect or merge. The recesses may have a constant diameter or dimension, or the diameter or dimension of a recess may vary to accommodate a specific configuration.

According to some embodiments, portions of the cable assembly 200 may be made of, for example, foam polypropylene, polyethylene, or a composite of other such positively buoyant materials. Mechanical reinforcements may be provided in some embodiments in order to facilitate long-term deployment and retrieval.

The outer shell 304 of the cable assembly 200 may provide one or more recesses along its length, configured to accept the specified (e.g., standard) conducting cables, which can be pressed in, either manually or by special tooling. These recesses may be spaced equally around the circumference of the outer shell 304 in some embodiments. The core material may be designed to give a desired buoyancy to the complete cable assembly. For example, in some embodiments, the core material may be of a lower density than the outer shell material. The core material may be a foam polymer selected from the group consisting of polyethylene, polypropylene, polyurethane, polyisocyanurate, polystyrene, polybutadiene, polyisoprene, or any mixture thereof. The outer shell may be a dense polymer selected from the group consisting of polyethylene, polypropylene, polyurethane, polyisocyanurate, polystyrene, polybutadiene, polyisoprene, or any mixture thereof. Recycled plastic may be used for the core material and/or the outer shell material.

According to some embodiments, the one or more recesses may be extruded in a helical fashion so as to provide the cable assembly with improved flexing properties. After the cables 208 are disposed in the recesses 202, the cable assembly may further be fitted with an extra outer protective cover such as braiding, or a weave or mesh, in order to offer more protection to the cables and other members herein described. Such an outer protective cover may feature openings to allow the cables to contact water. Strength member(s) may also be included, either inside the outer shell 304 or in additional locations on the circumference.

Accordingly, some embodiments of this disclosure may provide some of the following benefits:
1. A less expensive EM Source cable assembly solution.
2. Conducting cable cores, wires, and optionally devices in a cable assembly may be standard "off the shelf" cables.
3. Reduced dependency on specialized manufacturers.
4. Simpler termination may be used for smaller cable assemblies.
5. Conducting cable cores, wires, and optionally devices in a cable assembly may be replaced at little cost if damaged.

6. Using multiple conducting cables or wires (e.g., 7) in a cable assembly may provide redundancy in the event of a failure.
7. Cable assembly may provide buoyancy in addition to, or in lieu of, external floatation.
8. Cable assembly may be a simple coextrusion that can be manufactured in large quantities at low cost.
9. A smooth or mostly smooth outer surface may have fewer areas that encourage barnacle growth.

Any of the cable assemblies described herein may further include openings 408 (FIG. 4) formed in a central region of the buoyant member 402 or 202, which may accommodate additional wires, optical fibers, or devices, such as strength members. An advantage of locating cables at the surface of a cable assembly is that cables that emit heat may be in intimate thermal contact with water, which can serve as a cooling medium for the cables. Cables to be cooled may be located in the surface recesses of the cable assembly, while cables with more thermal tolerance, for example signal cables, may be disposed through the core of the buoyant member, if desired. The cable assemblies described herein may provide buoyancy inside the cable assembly, with the wires or other dense members on the outside of the assembly.

The cable assemblies described herein may further include a covering, such as a wrap, braid, weave, mesh, or other enclosure around the periphery of the outer shell, recesses, and cables to protect and/or insulate the cables from the surrounding environment. The covering may be a cord, a wire, a cable, a ribbon, a sleeve, a conduit, or a casing, among other possible embodiments. A cord or wire may be wrapped around the cable assembly in a helical or multi-helical fashion or braided around the cable assembly. The cord or wire may be conductive or non-conductive, and may have a function besides protection of the members disposed in the cable assembly. For example the wire may carry electric power. Such coverings may feature openings to allow water to contact the cables disposed in the cable assembly.

Figure 5A:
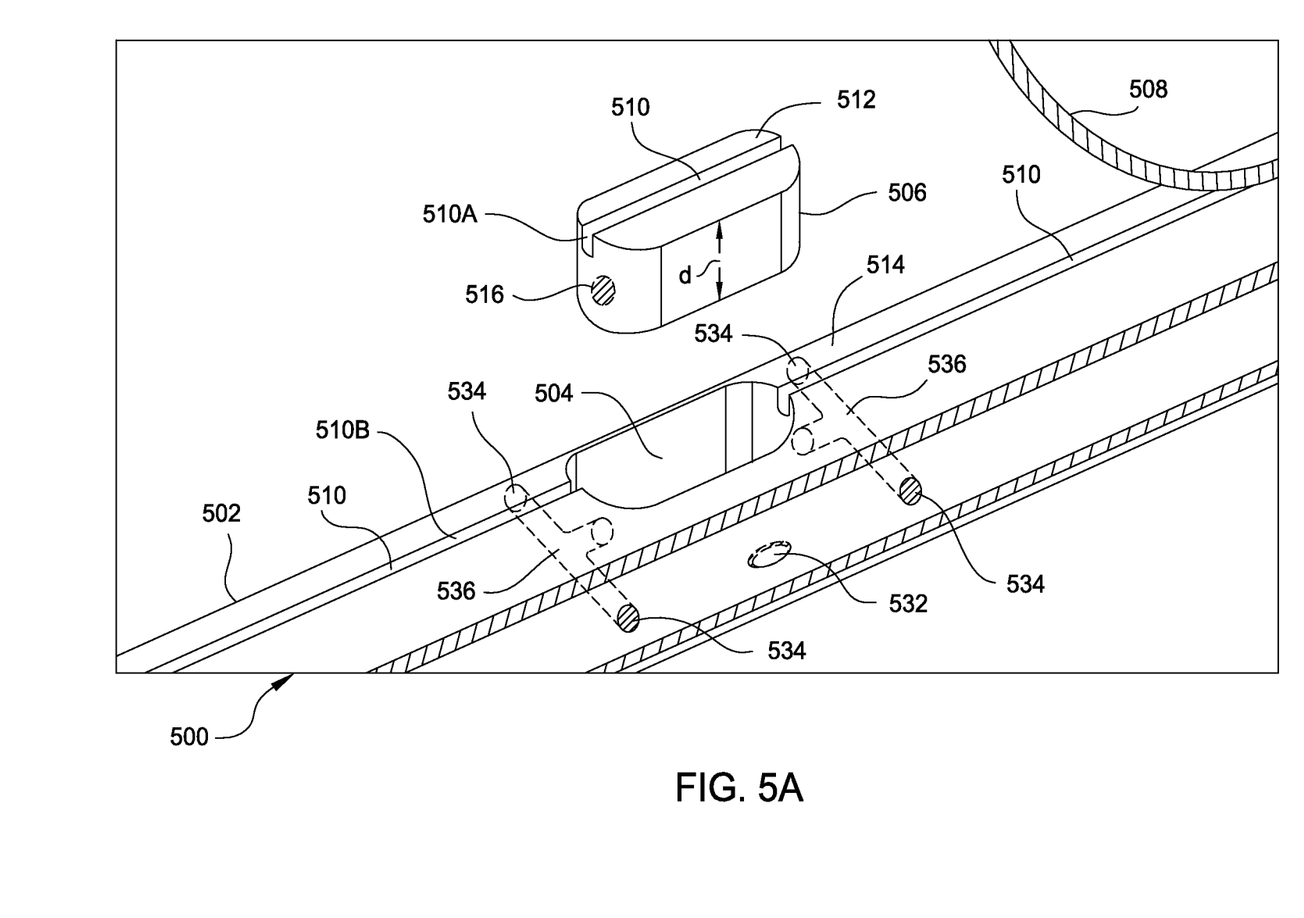
FIG. 5A is a perspective view of a cable assembly according to another embodiment.

A cable assembly as described herein may further include hard points. FIG. 5A is a perspective view of a cable assembly 500 according to another embodiment. The cable assembly 500 includes a buoyant member 502 similar in most respects to the buoyant members described elsewhere herein, with the exception that a recess 504 is formed in the buoyant member 502 to accommodate an insert 506. The insert 506 may be a hard point that houses, couples, or secures one or more devices, enabling inclusion of equipment in the cable assembly 500 that may be useful for performing functions typically useful in EM surveying. Such equipment may be disposed in the recess 504, and the insert 506 may be seated in the recess 504, for example, over the equipment. A cable 508 may be disposed in a cable recess 510 formed in the buoyant member 502 and securing the insert 506 in the recess 504 to hold the equipment in the recess 504. In some embodiments, cable 508 may carry power, signals, or data, or cable 508 may be a non-conducting structure that secures insert 506 in the recess 504.

The insert 506 and the recess 504 may be shaped to accommodate any equipment that might be usefully disposed in the recess 504. Such equipment may include instruments for monitoring various parameters of the EM survey equipment, such as voltages and currents, or instruments for detecting position, among others. The insert 506 may occupy substantially all the open volume of the recess 504 in one embodiment. In another embodiment, the insert 506 may occupy only a fraction of the open volume of the recess 504 to allow room for locating devices in the recess 504. In one example the insert 506 may have a dimension "d" that is less than a depth of the recess 504, leaving an open volume under the insert 506 when the insert 506 is disposed in the recess 504. For example, the dimension "d" may be about 50% of the depth of the recess 504, such that an open volume of the recess 504 under the insert 506 has a depth that is about equal to the dimension "d" of the insert.

In an embodiment where a device is disposed in a portion of the recess 504 under the insert 506, one or more sides of the insert 506 and the recess 504 may be tapered to control how the insert 506 fits in the recess 504. The recess 504 and the insert 506 may be shaped so that an upper surface 512 of the insert 506 is even with a surface 514 of the buoyant member 502 when the insert 506 is disposed in the recess 504. The recess 504 and the insert 506 may be shaped so that a portion 510A of the cable recess 510 formed in the insert 506 is even with a portion 510B of the cable recess 510 formed in the buoyant member 502 when the insert 506 is disposed in the recess 504.

The insert 506 may have an opening 516 that may be used to dispose a device in the buoyant member 502. The opening 516 may be any convenient size and shape, may be formed in or through any surface of the insert 506, and may extend partway through or completely through the insert 506. The insert 506 may be shaped like an ovoid box, as shown in FIG. 5A, or the insert may have any other convenient shape, such as a wedge or truncated wedge. It should be noted that any combination of features described in connection with the cable assemblies of FIGS. 2-4 may be used with hard points as described in connection with FIG. 5A. For example, the cable recess 510, along with the other cable recesses of the cable assembly 500, may be oriented in a helical pattern. The insert 506 may cross or subtend more than one cable recess 510 in some embodiments. For example, two or more cable recesses 510 may cross the insert 506. In such an embodiment, each cable that is disposed in a cable recess 510 crossing the insert 506 might be extracted from its cable recess 510 before the insert 506 would be removed from the recess 504. Alternately, the insert 506 may be extracted without removing the cables from the cable recesses 510.

The insert 506 may form a friction fit or a press fit with the recess 504. The fit is typically water tight. In some embodiments, the insert 506 may be bonded into the recess 504, for example by using an adhesive or potting compound. In other embodiments, the insert 506 may be welded into the recess 504 by sonic welding or heat welding. For example, a contact surface of the insert 506 and/or the recess 504 may be softened or melted by heating prior to seating the insert 506. Extraction of the insert 506 may be aided, if desired, by providing a connection in the insert for attachment of an extraction tool. Such a tool might be a threaded handle that may be screwed into a threaded connection formed in an exposed surface of the insert 506.

In the embodiment wherein a device is disposed in the recess 504, the device might be configured to operate in contact with water. In such an embodiment, an opening 532, shown in phantom, may be provided in a surface of the buoyant member 502 to provide communication from outside the buoyant member 502 to the interior of the recess 504 for ingress of water. In the embodiment wherein the device is disposed in the opening 516, one or more openings 534 may be provided with a passage 536 through the buoyant member 502 to provide communication from outside the buoyant member 502 into the opening 516 for ingress of water.

The insert 506 may be made of the same material as the buoyant member 502, or a different material. The insert 506 may be a buoyancy adjustment member. If less buoyancy is desired, the insert 506 may be made from a material having higher density than the material of the buoyant member 502. If more buoyancy is desired, the insert 506 may be made from a material having lower density than the material of the buoyant member 502. The density of the material from which the insert 506 is made may also be selected to provide a desired buoyancy of the overall cable assembly 500. For example, if the dimension "d" of the insert 506 is less than the depth of the recess 504, such that an open volume remains under the insert 506, the density of the material from which the insert 506 is made may be selected to compensate for the added buoyancy of the open volume.

Any number of hard points, such as the insert 506, may be included in a cable assembly. The hard points may be provided at any desired interval along the cable assembly. The interval may be constant or varying, and may be different for different portions of a cable assembly. More than one hard point may be located at a single longitudinal location of a cable assembly, if desired. The hard points may be distributed angularly around the cable assembly. In one embodiment, a first insert may be disposed in an opening on a first side of the cable assembly, and a second insert may be disposed in the opening on a second side of the cable assembly opposite the first side, such that the first insert and the second insert cooperatively form a hard point that penetrates through the cable assembly from the first side to the second side thereof. In such an embodiment, the first and second inserts may form a box that may contain devices for performing desired functions of the cable assembly.

A plurality of inserts having a wedge shape or a truncated wedge shape may be located at substantially the same longitudinal location along a cable assembly. The inserts may be distributed around a circumference of the cable assembly. In some embodiments, side walls of the inserts may come into contact, one with another.

If devices are disposed in a recess or a hard point of the cable assembly defined by an insert, wires may be connected to the device, if desired, by providing a passage through a wall of the hard point. The passage may register with an opening such as one of the openings 408 described in connection with FIG. 4. In some embodiments, devices disposed in the recess 504 or in the insert 506 may connect to a cable that crosses the insert 506, such as the cable 508. In such an embodiment, a connection may pass through a portion of the insert 506 in the cable recess 510 holding the cable 508.

Figure 5B:
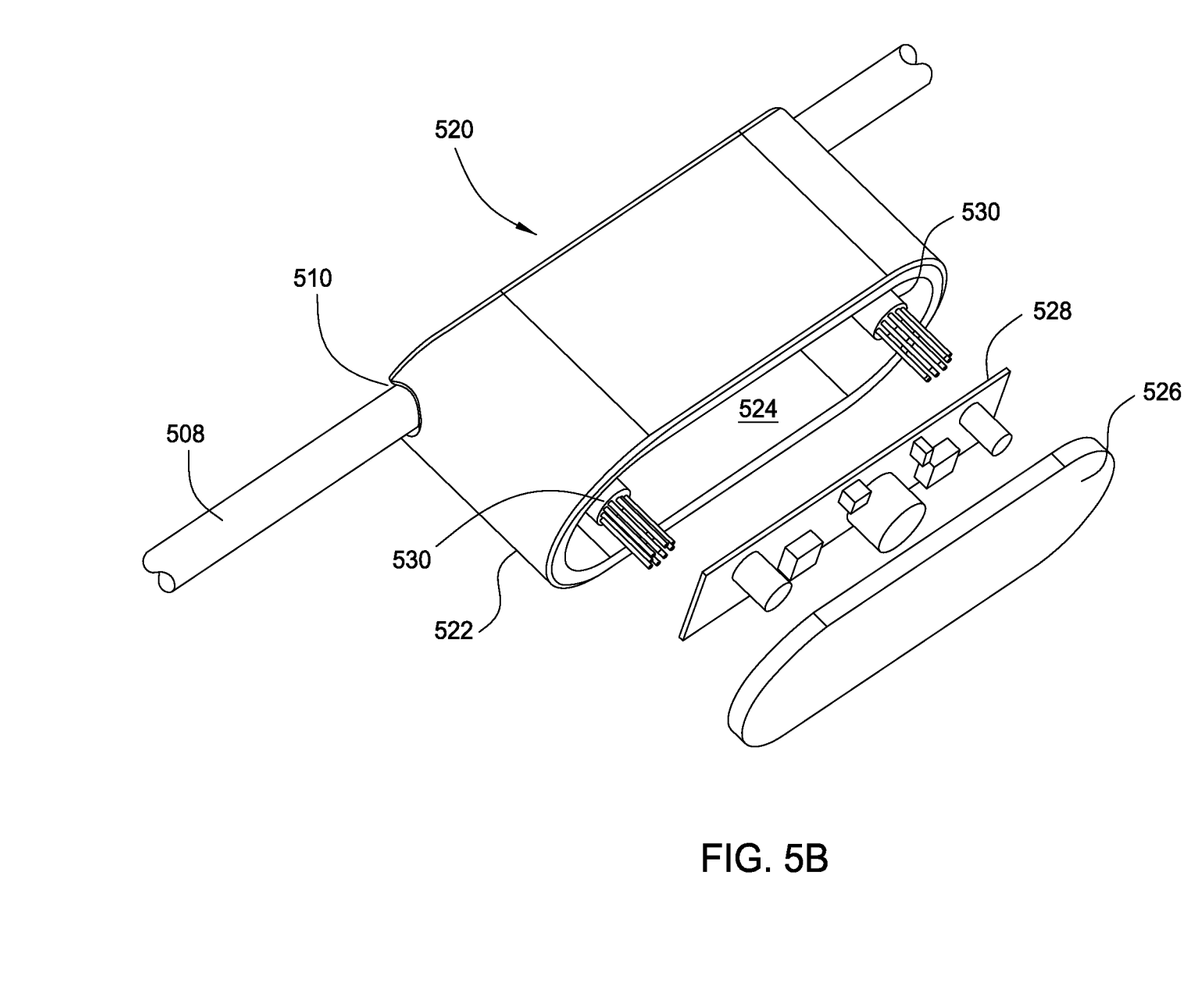
FIG. 5B is a perspective view of a hard point according to one embodiment.

FIG. 5B is a perspective view of a hard point 520 according to another embodiment. The hard point 520 comprises a container 522 that encloses an internal volume 524. The container 522 has a lid 526 that seals the internal volume 524 by any convenient means, such as friction fit, press fit, potting, or bonding with adhesive. The hard point 520 also has the cable recess 510 formed in a surface thereof, in which a cable 508 is disposed. A device 528 may be disposed in the internal volume 524. The device 528 may be connected to connectors 530, which may be connected to the cable 508 through a lower surface of the cable recess 510. The device 528 may be secured to the lid 526 or attached to the lid 526, if desired. The device 528 may be an instrument, such as a current detector or position detector, and the cable 508 may carry power, signals, or data to and from the device 528.

The hard point 520 may be the insert 506 of FIG. 5A, and may be disposed in the recess 504 of the cable assembly 500 of FIG. 5A. As shown in FIG. 5B, the hard point 520 may be extracted from the recess 504 without detaching the cable 508 from the cable recess 510. The lid 526 may then be removed to access the device 528 inside the internal volume 524.

Figure 5C:
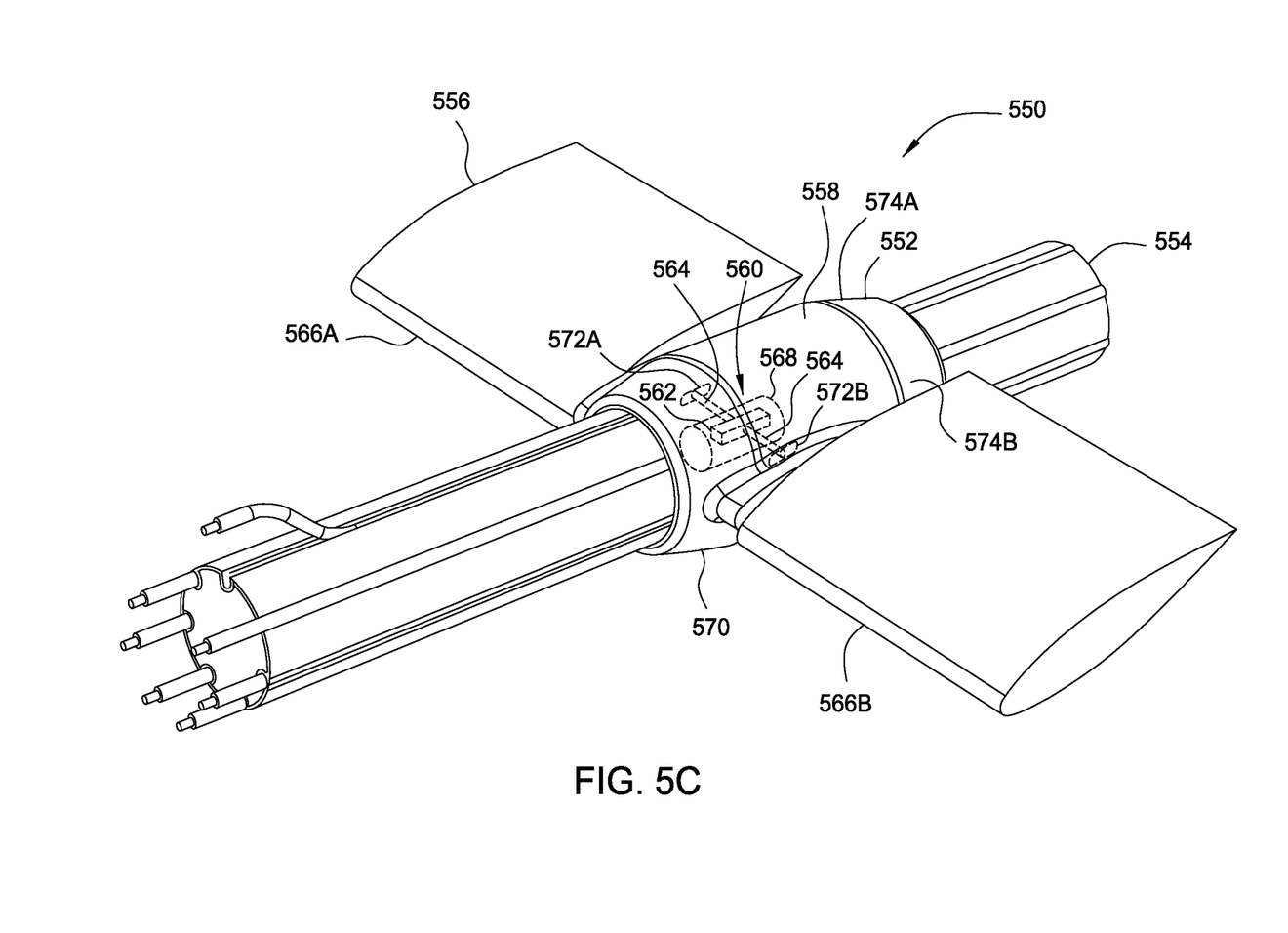
FIG. 5C is a perspective view of a cable assembly with a hard point according to one embodiment.

FIG. 5C is a perspective view of a cable assembly 550 with a hard point 552 according to another embodiment. The cable assembly 550 has a buoyant member 554 similar to the buoyant members described above. The hard point 552 includes a steering device 556, which may be a wing or a rudder. The hard point 552 includes a body portion 558, to which the steering device 556 is attached. The body portion 558 includes hardware 560 that actuates the steering device 556. The hardware 560, shown in phantom, includes an actuator 562, such as a rotary positioner, disposed near an axis of the cable assembly 550. Supports 564 extend from the actuator 562 to a first vane 566A and a second vane 566B. The actuator 562 is disposed in a recess 568 formed in the buoyant member 554, and the supports 564 extend through openings in the buoyant member 554 to couple to the vanes 566A/B. The vanes 566A/B may be removably coupled to the support 564 to facilitate installation of the hard point 552. The supports may also be removably coupled to the actuator 562. The hard point 552 has a casing 570 that surrounds the buoyant member 554 and includes openings 572A and 572B through which the supports 564 couple to the vanes 566A/B The actuator 562 may be connected to power by connecting to one of the cables 508 through the buoyant member 554. The casing 570 may have two pieces 574A and 574B that may be detached to remove the casing 570 from the cable assembly 550, and reattached to closing the casing 570 around the cable assembly 550. The pieces 574A/B may be attached by any convenient means, such as by latches, screws, bolts, snaps, and the like.

The cables described herein as suitable for use with the buoyant members and cable assemblies described herein may be power cables, signal cables, data cables, strength members, buoyancy members, ballast members, or combinations thereof. An EM source may be constructed by disposing an EM emitter in one of the buoyant members described herein, according to any disclosed method. The EM emitter may be disposed in a cable recess of the buoyant member in some cases, or in a hard point. The EM emitter may be connected to a power cable disposed in a recess in the surface of the buoyant member, and may be connected to a signal cable disposed in the same recess or in a different recess of the buoyant member. The EM source may include more than one EM emitter, and may include more than one power cable and/or signal cable.

The EM source cable assemblies described herein may be deployed for geophysical prospecting by unreeling from a spool, and may be stowed by reeling onto a spool. A buoyant member, such as those described herein, may be provided that imparts a desired buoyancy and flexibility for ease of use. Various cables, such as power cables, signal cables, EM emitter cables, data cables, and the like, as described herein, may be disposed in the surface recesses of the buoyant member, and an EM emitter cable may be energized to generate electromagnetic fields useful for geophysical prospecting.

An EM sensor cable assembly may also be constructed using the buoyant members described herein. An EM sensor, such as an electrode, may be disposed in one of the buoyant members described herein, according to any disclosed method. The EM sensor may be disposed in the buoyant member in ways similar to the EM source, and may be connected to power and/or signal wires similarly. The EM sensor may comprise one or more electrodes disposed in a cable with a strength member and power wires, all of which may be disposed in a recess of a buoyant member as described herein. An EM sensor cable assembly may be fashioned into a streamer or a streamer segment by applying connectors to the ends thereof.

Alternately, an EM sensor cable assembly may be made by disposing one or more electrodes in a hard point of a cable assembly, as described above. If water contact is desired, a hard point providing water contact or immersion may be used. Power connections may connect power from a power cable disposed in a cable recess of the cable assembly to the electrode in the hard point. Other instruments, such as analog-to-digital converters, switches, and data transceivers, may also be disposed in hard points of an EM sensor.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

While the foregoing is directed to embodiments of the present invention, other and further embodiments of the invention may be devised without departing from the basic scope thereof, and the scope thereof is determined by the claims that follow.

The invention claimed is:

1. An electromagnetic (EM) source for geophysical prospecting, comprising:
   a buoyant member having first and second ends, and a longitudinal axis connecting the first end to the second end;
   a plurality of recesses disposed along an external surface of the buoyant member between the first end and the second end, wherein the recesses receive corresponding cables; and
   an EM emitter connected to at least one of the cables.

2. The EM source of claim 1, wherein the recesses are arranged helically about the longitudinal axis.

3. The EM source of claim 1, wherein the recesses extend parallel along the longitudinal axis.

4. The EM source of claim 1, wherein a core of the buoyant member comprises a low density material.

5. The EM source of claim 4, wherein an outer shell of the buoyant member comprises a material denser than the low density material.

6. The EM source of claim 1, wherein the recesses are evenly spaced around the longitudinal axis of the buoyant member.

7. The EM source of claim 5, wherein the low density material comprises a material selected from the group consisting of polyethylene, polypropylene, polyurethane, polyisocyanurate, polystyrene, polybutadiene, polyisoprene, or any mixture thereof.

8. The EM source of claim 7, wherein the material of the outer shell is selected from the group consisting of polyethylene, polypropylene, polyurethane, polyisocyanurate, polystyrene, polybutadiene, polyisoprene, or any mixture thereof.

9. The EM source of claim 5, wherein the low density material is a different material from the material of the outer shell.

10. The EM source of claim 1, wherein the buoyant member comprises a polymer foam core.

11. A cable assembly, comprising:
    a buoyant member comprising recesses in an external surface thereof; and
    a plurality of cables including a power cable disposed in the recesses of the buoyant member, wherein the cable assembly is an electromagnetic source cable for geophysical prospecting, wherein the buoyant member is configured to provide buoyancy operable to support the cable assembly when being towed underwater at a depth of greater than 10 m.

12. The cable assembly of claim 11, wherein the buoyant member comprises a core and an outer shell, the outer shell formed around the core and conformally covering the recesses.

13. The cable assembly of claim 12, wherein the plurality of cables comprises a strength member.

14. The cable assembly of claim 12, wherein the core comprises a foam polymer selected from the group consisting of polyethylene, polypropylene, polyurethane, polyisocyanurate, polystyrene, polybutadiene, polyisoprene, or any mixture thereof.

15. The cable assembly of claim 14, wherein the outer shell comprises a high density polymer selected from the group consisting of polyethylene, polypropylene, polyurethane, polyisocyanurate, polystyrene, polybutadiene, polyisoprene, or any mixture thereof.

16. The cable assembly of claim 15, wherein the recesses are arranged helically along the external surface.

17. The cable assembly of claim 15, wherein the outer shell and the core are the same material.

18. The cable assembly of claim 14, wherein the core has a varying density.

19. The cable assembly of claim 11, further comprising a hard point.

20. The cable assembly of claim 19, wherein the hard point comprises an insert disposed in a recess formed in the buoyant member.

21. The cable assembly of claim 20, wherein the hard point houses a device.

22. The cable assembly of claim 11, further comprising a protective covering over the buoyant member.

23. A method of geophysical prospecting, comprising:
    providing an electromagnetic source cable assembly comprising a buoyant member having a plurality of recesses formed in an external surface thereof, with an electromagnetic emitter cable disposed in one or more of the recesses;
    energizing the electromagnetic emitter cable to generate signals that interact with geological features; and
    conducting an electromagnetic survey by detecting the signals.

24. The method of claim 23, further comprising housing one or more devices in a hard point of the electromagnetic source cable assembly.

25. The method of claim 23, further comprising deploying the electromagnetic source cable assembly by unreeling the electromagnetic source cable assembly from a spool.

26. The method of claim 23, wherein the buoyant member is extruded, and the buoyant member has a buoyancy selected to compensate for the weight of the electromagnetic source cable assembly.

27. The method of claim 23, wherein the plurality of recesses extend along a longitudinal axis of the buoyant member.

* * * * *